United States Patent [19]

Okuda et al.

[11] 4,131,258
[45] Dec. 26, 1978

[54] CONNECTOR FOR PLATES

[75] Inventors: Seiji Okuda; Takuo Yuda, both of Yokohama, Japan

[73] Assignee: Nifco, Inc., Tokyo, Japan

[21] Appl. No.: 695,355

[22] Filed: Jun. 14, 1976

[30] Foreign Application Priority Data

Jun. 13, 1975 [JP] Japan .................. 50/79428

[51] Int. Cl.² .................. F16B 13/10; F16L 3/02
[52] U.S. Cl. .................. 248/73; 24/73 RM; 24/221 R; 85/5 P; 85/80; 248/74 A
[58] Field of Search .......... 24/73 PF, 73 RM, 221 R, 24/221 L; 403/14, 323, 348, 349, 408, 409; 248/73, 74 A; 85/5 P, 80

[56] References Cited

U.S. PATENT DOCUMENTS

| 2,789,842 | 4/1957 | Lief .................. 85/5 R X |
| 2,909,957 | 10/1959 | Rapata .................. 248/73 |
| 3,123,389 | 3/1964 | Biesecker .................. 24/221 L X |
| 3,298,071 | 1/1967 | Flora .................. 24/221 L X |
| 3,443,783 | 5/1969 | Fisher .................. 85/5 R |
| 3,574,899 | 4/1971 | Fisher .................. 85/80 X |
| 3,701,302 | 10/1972 | Pestka et al. .................. 85/80 |
| 3,826,458 | 7/1974 | Fisher .................. 85/80 |
| 3,869,958 | 3/1975 | Murayama .................. 85/80 |
| 3,880,396 | 4/1975 | Freiberger et al. .................. 24/221 L X |
| 3,921,261 | 11/1975 | Fisher .................. 24/221 R |

FOREIGN PATENT DOCUMENTS 611760 10/1960 Italy .................. 24/221 L

*Primary Examiner*—Rodney H. Bonck
*Attorney, Agent, or Firm*—Jack R. Halvorsen; Robert W. Beart

[57] ABSTRACT

Disclosed is a connector for plates, which comprises a basic portion, operating means disposed on one surface of said basic portion, a chamfered fitting portion formed on the other surface of said basic portion in a planar shape substantially equalling the shape of a perforation bored in a given plate, and an anchor member having a length slightly smaller than the largest width of the perforation in said plate and possessing an inclined shoulder along the portion at which the anchor comes into contact with said fitting portion. The anchor member slides into fast hooking engagement with the edge of said perforation when the anchor member is passed through the perforation in a plate (or plates) and the entire connector proper is subsequently turned about its center. The connector of the present invention, thus, serves to join face-to-face a plurality of plates or attach itself securely to a plate (or plates).

9 Claims, 13 Drawing Figures

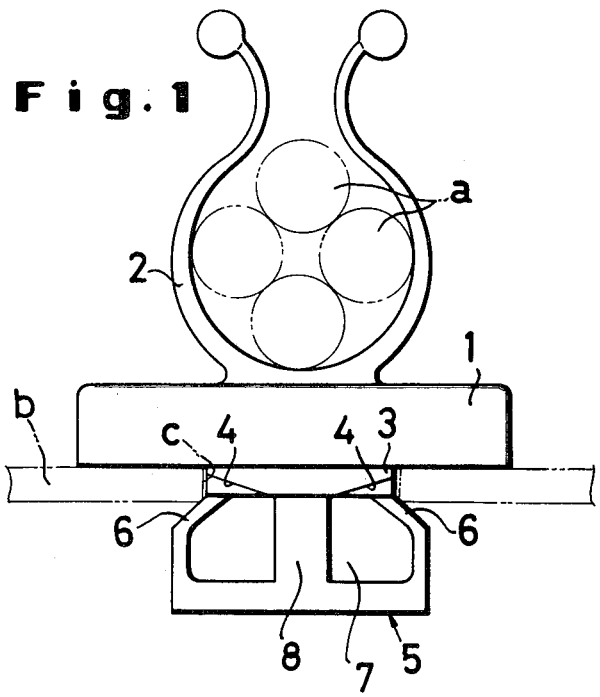
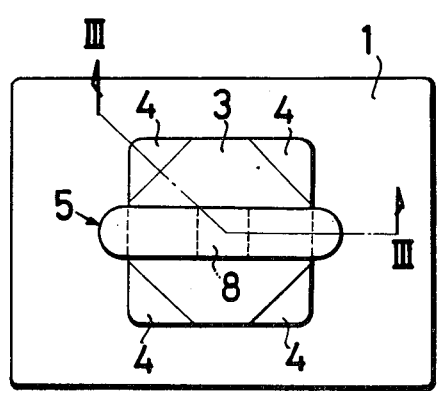
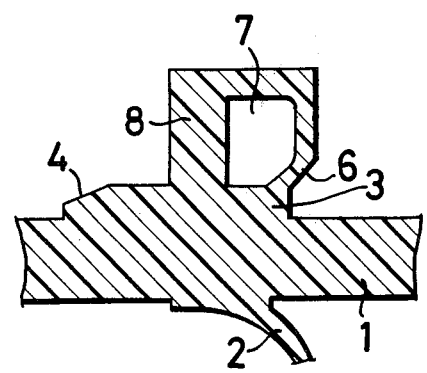

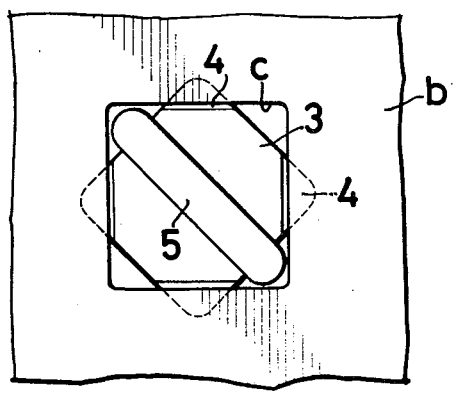
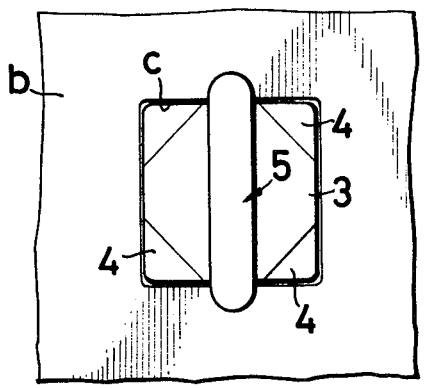
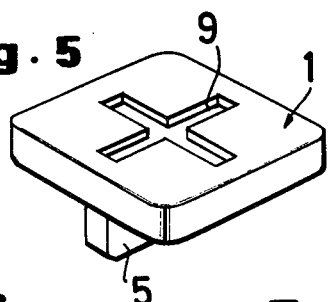
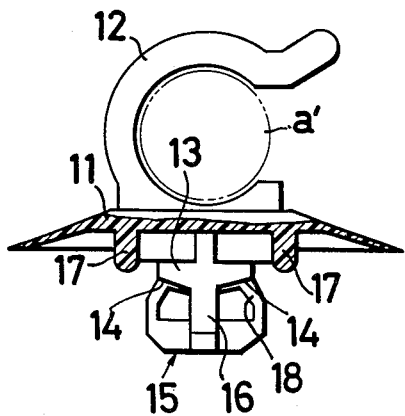
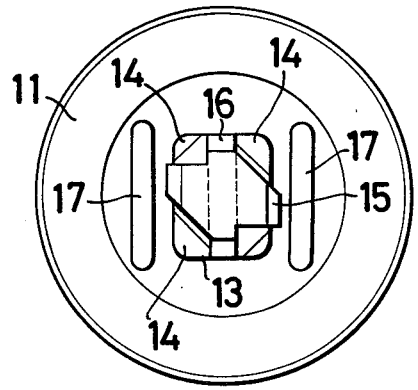

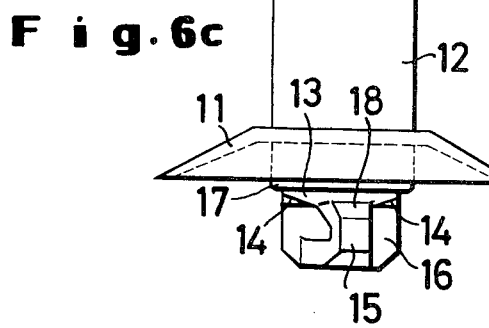
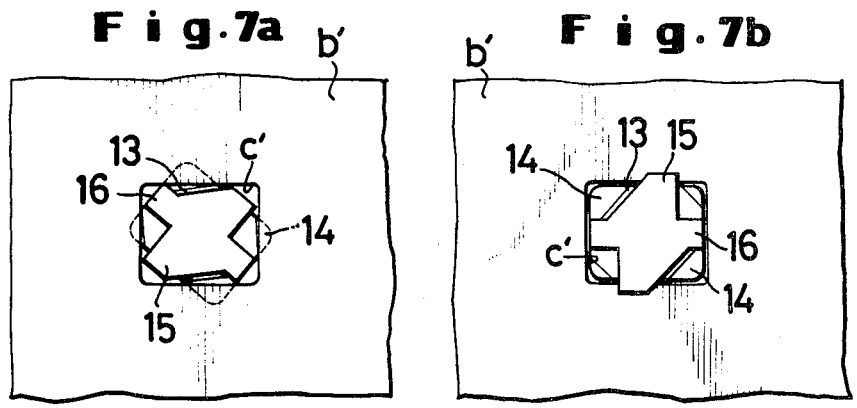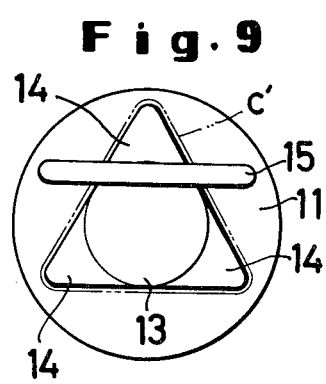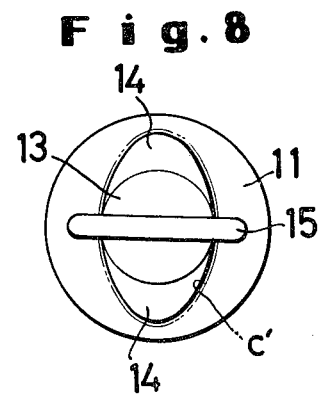

CONNECTOR FOR PLATES

BACKGROUND OF THE INVENTION

The invention relates to a connector for plates, which is useful for attaching a linear member or some other member fast to a plate or for joining face-to-face two or more plates.

Conventional connectors of this type have preponderantly consisted of a pair comprising a male member and a female member. Such a connector serves to attach a clamp or a similar article fast to a plate or join a plurality of plates face to face by the medium of a plate and by means of screws or meshes. There has also been proposed a connector for plates, which comprises a flange and a shank disposed on said flange and provided with a claw. It serves to attach itself fast to a plate or to join a plurality of plates face to face when the shank thereof is inserted through the perforation bored in a plate to an extent such that only the claw slides clearly past the perforation and snaps into fast hooking engagement with the edge of said perforation.

The former connector for plates is composed of two parts in such way that, when it is attached fast to a plate, it inevitably requires a complicated operation to be performed behind the plate. In the case of the latter connector, the work for attachment thereof to a plate is relatively easy. Nevertheless it involves a disadvantage that desired attachment is not obtained with perfect stability and accuracy or it is not obtained at all if the thickness of the space for receiving a plate between the lower surface of the flange and the upper surface of the claw differs from the thickness of the plate even to the slightest degree.

The connectors of this type including those described above are chiefly made of metallic materials. If they are to be made of plastic materials, their structures are relatively complicated and, therefore, frequently defy all attempts at one-shot molding. Even if such a connector is somehow adapted to one-shot molding, the injection molding of plastic materials necessitates use of metal dies consisting of three or more split segments.

The primary object of this invention is to provide a connector for plates, which provides perfect face-to-face union of a plurality of plates or permits fast attachment of a linear material or some other material to a plate through a simple operation.

Another object of this invention is to provide a connector for plates which is capable of connecting various plates differing considerably in, for example, the shape of the perforation bored in said plate and the thickness of the plate.

Still another object of the present invention is to provide a connector for plates, which can easily be shaped in a unitary form by injection molding of a plastic material.

SUMMARY OF THE INVENTION

To attain the objects described above, the connector for plates according to this invention comprises a basic portion, operating means disposed on one surface of said basic portion, a chamfered fitting portion formed on the other surface of said basic portion in a planar shape substantially equalling the shape of a perforation bored in a given plate, and an anchor member disposed through the medium of said fitting portion, having a length slightly smaller than the largest width of the perforation in said plate and possessing an inclined shoulder along the portion at which the anchor member comes into contact with said fitting portion.

A simple operation of passing the anchor member completely through the perforation in the plate and subsequently turning the entire connector proper around its center causes the shoulder portion of the anchor member to slide into fast hooking engagement with the edge of the perforation in the plate. This engagement is powerful because the shoulder portion of the anchor member presses itself against the plate. If the perforation in the plate is more or less larger than the area of the fitting portion or if the plate has a more or less great thickness, this engagement is obtained since the connector is made of a plastic material abounding in flexibility. The shape and the thickness of the plate, therefore, can vary widely.

Further, the connector for plates according to this invention comprises members simple in structure and, therefore, can easily be shaped in a unitary form by the injection molding of a plastic material.

The aforementioned objects of this invention and other objects and characteristic features thereof will become apparent from the description to be given in full detail herein below with reference to the accompanying drawing.

BRIEF DESCRIPTION OF THE DRAWINGS

FIG. 1 is a front view illustrating one preferred embodiment of the connector for plates according to the present invention.

FIG. 2 is a bottom view of the connector for plates of FIG. 1.

FIG. 3 is a cross section taken along the line III—III in FIG. 2.

FIGS. 4a and 4b are bottom views of the connector, drawn to illustrate the procedure in which required connection is made by use of this connector.

FIG. 5 is a perspective view illustrating another embodiment of the operating means in the connector for plates according to the present invention.

FIGS. 6a, 6b and 6c are respectively a front view, a bottom view and a side view illustrating another embodiment of the connector for plates according to the present invention.

FIGS. 7a and 7b are bottom views illustrative of the procedure in which desired connection is obtained by use of the preferred embodiment of FIG. 6.

FIGS. 8 and 9 are bottom views of yet other preferred embodiments of the connector for plates according to the present invention.

DESCRIPTION OF THE PREFERRED EMBODIMENTS

FIGS. 1, 2 and 3 show one preferred embodiment of the connector for plates according to this invention. A basic head portion 1 is provided, on one surface thereof, with the operating means 2 adapted to impart a rotary motion to the connector and, on the other surface thereof, with the connecting means for plates consisting of a fitting portion 3 and an anchor member 5.

In the preferred embodiment of FIG. 1, the operating means 2 functions not only to rotate the entire connector proper but also to enable a linear material a to be attached fast to a plate, for example. It is made up of S-shaped members disposed opposite each other. It is so designed that the linear material held therein can be prevented from escape when the ends of said S-shaped members are twisted around each other. This operating means 2 may instead be a member of the shape of a pouch capable of encircling said linear material or some other material.

In the connector of this preferred embodiment, the perforation c bored in a plate b subjected to connection is square in shape. An anchor member 5 is disposed through the medium of a fitting portion 3 having a shape substantially equalling the shape of said perforation c. The anchor 5 has a dimension from side to side substantially equalling the greatest straight line that runs across the square perforation c (namely, the diagonal line). That is to say, the length of the anchor member 5 is substantially equal to the diagonal line of the fitting portion 3. This anchor member 5 is composed of a flat plate possessing inclined shoulder portions 6, windows 7 perforated through said flat plate and a support 8 interposed for the purpose of reinforcement between said windows 7. The anchor member 5 is disposed on the surface of the fitting portion 3 in such way as to intersect the width of said fitting portion at its center, with the shoulder portions 6 converting to a length equalling the lateral width of the fitting portion 3.

In the fitting portion 3 having a square area, the four corner portions each have a surface 4 slanted so that they decrease in wall thickness toward their apexes.

To attach the connector fast to a plate, the anchor member 5 is inserted into the perforation c in the direction of the diagonal line until the slanted surfaces 4 at the four corner portions of the fitting portion comes into contact with the surface of said plate (FIG. 4a). When the plate b has a thickness slightly greater than the height of the fitting portion 3 as indicated by the chain lines in the diagram of FIG. 1, the edges of the perforation on one surface of the plate collide into the slanted surfaces 4 of the fitting portion as the anchor member is inserted along the diagonal line of the perforation. Consequently, the plate assumes a position raised by a distance corresponding to the thickness of the slanted corner portion 4 at the point of collision. At this time, the edges of the perforation on the other surface of the plate takes up a position about the middle of the inclined shoulder 6 of the anchor member. In that state, the entire connector proper is turned around its center by 45 degrees, with the result that the plate is pressed along the inclined shoulders 6 and the fitting portion 3 comes to rest snugly in the perforation c (FIG. 4b). The perfect engagement which the fitting portion thus secures the perforation places a check on the freedom of rotation of the connector proper and perfectly precludes the possibility of separation of the anchor member from the plate due to its otherwise possible rotation. The elasticity which constitutes one characteristic attribute of the plastic material keeps the plate in a pressed state at all times and consequently the connector proper in an immobilized state.

When the connector is fixed fast on the plate as described above, a linear material a or some other material desired to be attached to the plate has simply to be fastened to the operating means 2 which has an additional function of keeping fast hold of such material. As previously described, the operating means 2 will suffice insofar as it is possessed of means for holding such material and, therefore, may be shaped in a form most suited to the purpose of attachment.

Where the connector is to be utilized for face-to-face union of a plurality of plates, perforations of one and the same shape are bored through the plates. Then the plates are piled up one on top of another, with the perforation brought into perfect registration. The connector is now secured fast to the perforations in much the same way as described above. In this case, since the operating means 2 functions merely to impart a rotary motion to the connector, it may be shaped in the form of a slot 9 as illustrated in FIG. 5. Although a crossed slot is shown in the illustrated embodiment, a straight slot will effectively serve the same purpose.

FIGS. 6a, 6b and 6c illustrate another preferred embodiment of the present invention. The operating means 12 on the outer surface of the basic portion 11 of the shape of a suction disc proves to be most advantageous where the direction in which the given material to be received and held is fixed as in the case of the pouch illustrated and where the perforation c bored in the plate b has an oblong shape. The inner surface of the basic portion 11 is raised into a fitting portion 13 of a shape substantially equalling the shape of the perforation c in the plate b, with slanted faces 14, ... formed in the corner portions of the fitting portion.

On the surface of the fitting portion 13, an anchor member 15 is disposed in a direction intersecting the minor width of said fitting portion 13 at the center. The forward ends of the anchor member have their angular corners cut off to facilitate insertion into the perforation in the plate. Thus, the anchor member has a roughly octagonal front shape.

A support 16 is formed on the surface of the fitting portion 13 in a direction intersecting the major width of said fitting portion and perpendicularly crossing the anchor member 15 and has the same height as the anchor member 15. Thus, the support has a high reinforcing capacity.

Desired attachment to a given plate b' of the connector of the structure described above is accomplished by boring in said plate b' a perforation c' having the same shape as that of the fitting portion 13, passing the anchor member 15 through the perforation c', with the anchor member 15 borne in a direction in perfect conformity with the diagonal line of said perforation similarly to the preceding embodiment and with the support 16 consequently held in a direction in conformity with the other diagonal line of the perforation (FIG. 7a) and finally turning the basic portion 11 in such way that the anchor portion 15 comes to rest along the minor width of the perforation c' (FIG. 7b). As a consequence, the inclined shoulders 18 of the anchor member 15 slide into fast hooking engagement with the edges in the minor width of the perforation c' to establish a firm union between the connector and the plate. A linear material a' subjected to connection, therefore, can be fastened strongly to the plate by causing the linear material to be set fast in the operating means 12 which also functions as holding means. In the similar manner, a plurality of plates can be bound face to face by using the connector.

When elevated strips 17 are formed one each before and behind the fitting portion 13 on the inner surface of the basic portion, the upper faces of the elevated strips 17 press themselves against the plate as the connector is set in position on the plate and, thus, produce an effect which would be brought out if the basic portion 11 was designed as a sealing disc. The height of the fitting portion 13, therefore, must be substantially equallized with the thickness of the plate, with the plane passing through the free edge-contact surface of said elevated strips 17 as the reference plane.

In the preferred embodiments described to this point, the perforations bored in plates have been square or rectangular in shape. When necessary, they may be shaped in elliptic or triangular forms.

FIG. 8 illustrates a case wherein the perforation c' bored in the plate has an elliptic shape. As a natural consequence, the fitting portion 13 has an elliptic shape substantially equalling that of the perforation c'. The anchor member 15 which comprises a flat portion of a length substantially equalling the minor diameter of the ellipse and slanted faces 14 formed at the ends along the major diameter of said ellipse and has a width substantially equalling the major diameter of said ellipse is disposed in a direction intersecting the minor diameter of the ellipse. In this case, since the attachment of the connector to the plate is accomplished by a 90-degree rotation of the connector, the resultant union is much more powerful than that obtainable in any of the embodiments described above and increases the allowable range of plate thickness as well.

The connector illustrated in FIG. 9 is designed so as to match the triangular perforation c' bored in the plate. The fitting portion 13 has a planar shape substantially equalling the shape of the perforation c'. The anchor member which comprises a circular flat portion inscribable in the triangle of the fitting portion 13 and slanted surfaces 14 formed in the three corners and has a width substantially equalling one of the sides of said triangular perforation c' is disposed at a position such that it will slide past one of the sides of the perforation as the connector is rotated one third of a circle. In this case, since the required union is obtained completely by rotating the connector by 120 degrees around its center, a relatively small force will suffice for the purpose of this rotation. Moreover, the advantage derived from using an elliptic fitting portion can be enjoyed to an enhanced degree in this case. Although the illustrated embodiment uses an equilateral triangle, an isosceles triangle or even a scalene triangle is equally effective.

In all the preferred embodiments described above, the basic portions 1 and 11, the operating means 12, the fitting portions 3 and 13 and the anchor members 5 and 15 can easily be molded with polypropylene or some other thermoplastic synthetic resin in metal dies made up of two split segments. The attachment of the connectors to the plates can be obtained even if the fitting portions 3 and 13 and the perforations bored in plates have shaped other than the quadrilateral shape.

As is evident from the foregoing description, the apparatus according to the present invention comprises a basic portion, operating means formed on one surface of said basic portion, a fitting portion formed on the other surface of said basic portion and an anchor member formed on the surface of said fitting portion and adapted to gain passage through a perforation bored in a given plate in the direction in which the largest straight line runs across said perforation. The required attachment of this apparatus to the plate, therefore, can be obtained merely by rotating the connector proper around its center. The attachment, accordingly, can be accomplished simply by hand without requiring use of any special tool. When the attachment is effected, the fitting portion inserts itself in the perforation and, at the same time, the anchor member gets firm hold of the plate, so that the connector is no longer allowed to turn freely around its center or come off the plate easily. The connector will bring about its notable effect in the attachment of electric cable or bar material to a given plate or in the face-to-face union of a plurality of plates.

What is claimed is:

1. A one-piece plastic connector adapted for use in a polygonal shaped aperture in a flat plate, including an imperforate head portion, operating means disposed on one surface of said head portion, a noncircular fitting portion means disposed on the other surface of said head portion and having means defining a configuration substantially complimentary to the shape of said polygonal aperture in said plate, said fitting portion means including slanted surfaces tapering toward each of the corners thereof in the direction of said head but terminating in axially spaced relation to said head, a centrally disposed resilient plate-like anchor member extending axially out from and angularly disposed relative to said slanted surfaces on said fitting portion, said member having side-to-side dimension slightly smaller than the largest dimension of the aperture in said plate but greater than the distance between opposite sides of said polygonal aperture, said member being provided with inclined shoulders on the sides where the anchor member joins said fitting portion, said anchor member further including a pair of through apertures that form a centrally disposed rigid post-like member extending from the distal portion of the transverse surfaces of said plate-like member to the center of said imperforate head with its associated noncircular fitting portion, a free entering end including relatively flexible beam-like transverse portions extending radially outwardly from said post-like member a substantial extent, a pair of resilient substantially uniform thickness side walls extending generally perpendicular from the ends of said transverse member to a point intermediate the axial extent of said post-like member and thence angularly inwardly to their point of attachment to said fitting portion to thereby provide inclined shoulders in the form of resilient cam surfaces whereby upon application to a complimentary apertured workpiece said side walls and said free entering beam-like end portions flex during rotation until said fitting portion is seated in said aperture.

2. The connector for plates according to claim 1, wherein said operating means disposed on one surface of said head portion includes means to receive and hold in position a linear material.

3. The connectors for plates according to claim 1; wherein said operating means disposed on one surface of said head portion is in the form of a slot.

4. The connector for plates according to claim 1, wherein the planar shape of said fitting portion is a square.

5. The connector for plates according to claim 1, wherein the planar shape of said fitting portion is an ellipse.

6. The connector for plates according to claim 1, wherein the planar shape of said fitting portion is a triangle.

7. A connector for plates according to claim 1 wherein said fitting portion and its complimentary aperture which it is adapted to be accepted in is a square, said anchor member extending between and beyond two flat sides of said aperture and bisecting said sides, and said slanted surfaces tapering toward the corners of said square in the direction of said head portion.

8. A connector for plates according to claim 1 wherein said apertured plate-like anchor member and its centrally disposed post is provided with perpendicularly disposed reinforcing ribs that extend from adjacent the free end of said anchor member to said fitting portion.

9. A connector for plates according to claim 8 wherein said resilient side walls are provided with gussets extending between said resilient side walls and said reinforcing ribs, the outer surfaces of said gussets being angularly disposed relative to said ribs and adapted to be accepted and conform to the noncircular configuration of the aperture in said plate.

* * * * *